United States Patent Office 3,564,066
Patented Feb. 16, 1971

3,564,066
FIXED BED CATALYTIC PROCESS FOR THE PREPARATION OF TRICHLOROPROPANES
Emile Trebillon, Paris, and Georges Wetroff, Val d'Oise, France, assignors to Produits Chimiques Pechiney-Saint-Gobain, Neuilly-sur-Seine, France
No Drawing. Filed July 17, 1967, Ser. No. 653,655
Claims priority, application France, July 21, 1966, 70,265
Int. Cl. C07c 17/06
U.S. Cl. 260—659     5 Claims

ABSTRACT OF THE DISCLOSURE

A process for the production of trichloropropanes by reaction of propene, hydrogen chloride and oxygen in a molar ratio of propene/$O_2$/HCl of 1/0.65 to 1.40/2.0 to 6.5 at a temperature within the the range of 170° to 370° C. in the presence of a fixed bad catalytic mass having a compound of copper as the principal active agent deposited on a catalyst support having a specific surface within the range of 1 to 300 m.$^2$/g. and in which the maximum temperature reached in the interior of the catalytic mass is 30° to 200° above the wall temperature of the reactor and in which the materials are reacted at a flow rate of 1 to 100 moles of propene per liter of catalytic per hour.

---

This invention relates to the preparation of trichloropropanes by chlorination of propene or gaseous mixtures containing propene.

The catalytic oxychlorination of propene by HCl and oxygen is known. The reaction products, however, usually contain a very small proportion of trichloropropanes.

It is also known that the oxychlorination of propene is a highly exothermic reaction such that difficulty is experienced in the control of temperature within the reaction zone. Because of the very high temperatures existing CO and $CO_2$ as well as the formation of chloropropenes, such as allyl chloride, become the preponderant reaction products.

It is an object of this invention to provide a process which gives a high yield of trichloropropanes and which provides a high conversion rate of the reagents employed and which may be utilized as an industrial process for the production of trichloropropanes.

In accordance with the practice of this invention, propene or a gaseous mixture containing propene as an essential component is brought into reactive relation with HCl and oxygen or a gas containing HCl and oxygen. The raw materials are reacted in a molar ratio of propene/$O_2$/HCl of from 1/0.65 to 1.40/2.0 to 6.5 in a reaction zone having a wall temperature within the range of 170° to 370° C. and in the presence of a catalytic mass arranged in a fixed bed in which the principal active agent of the catalytic mass is a chloride and/or oxychloride of copper. The catalyst is deposited on a catalyst support having a specific surface within the range of 1 to 300 m.$^2$/g. and preferably 20 to 100 m.$^2$/g. In the interior of said catalytic mass, the maximum local temperature is 30° to 200° C. higher than the wall temperature and the flow rates of reagents are regulated to 1 to 100 moles of propene per liter of catalytic mass per hour.

As the catalyst support, use can be made of a material such as silica, diatomaceous earth, activated carbon, clay, kaolin, pumice and preferably alumina.

In accordance with a preferred practice of the invention, the reagents are employed in a molar ratio of propene/$O_2$/HCl of 1/0.90 to 1.10/2.5 to 3.5 and the wall temperature in the reaction zone is within the range of 200° to 320° with the hourly flow rate of propene within the range of 3 to 50 moles per liter of catalytic mass.

The catalytic ensemble, formed of the principal reactive agent and its support, usually is formulated to contain potassium chloride as an additive in an amount such that the potassium cation constitutes 1% to 10% by weight of said ensemble while the copper cation content comprises 3% to 15% by weight. It is also possible to incorporate other adjuvants into the catalytic mass, identified as promoters or accelerators, in the form of salts of zinc, nickel, iron, chromium and metals of the rare earths.

In one particular modification of utilizing the invention, the catalytic mass consists of the described catalytic ensemble and a diluent that is inert under the reaction conditions. Graphite serves well as diluent uniformly to distribute the heat of the reaction and to minimize local overheating. Such diluent may consist of 20 to 90% by volume of the catalytic mass. The latter may present a composition that is either uniform or ununiform, i.e. the diluent may be present in a concentration gradient differing along the reaction zone.

It is often times desirable to dilute the gaseous reagents by means of nitrogen and/or water vapor for the purpose of further minimizing local overheating.

It is also advantageous sometimes to preheat the reagents in a zone provided with catalytically and chemically inert materials heated to a temperature in the range of 170° to 370° C. before introduction of the reactants into the reactor.

Pressure is a factor that permits increased productivity in the process. Pressures within the range of 1 to 10 bars can be employed and it is preferred to make use of a pressure less than 7 bars.

Finally, if it is desired to maximize the yield of trichloropropanes, it is desirable to separate the reaction products into the useful components and then to recycle the chlorinated by-products, especially the monochloropropenes and the mono- and dichloropropanes which may be advantageously mixed with the feed reagents, particularly the propene.

The following examples are given by way of illustration, but not by way of limitation, of the practice of this invention:

EXAMPLE 1

A nickel tube having an interior diameter of 2.8 cm. and a length of 260 cm. is charged with 250 cm.$^3$ of glass rings and 500 cm.$^3$ of a catalytic mass consisting of an alumina support having a specific surface of 30 m.$^2$/g. in the form af balls having a diameter of 3 to 5 mm. and impregnated with 5% by weight copper in the form of $CuCl_2$ and 3% by weight potassium in the form of KCl.

The zone of glass rings functions in the role of a preheating zone.

While the tube is being heated exteriorally by an oil bath at a temperature of 300° C., the reactants are introduced at an hourly flow rate of 4 moles of propene, 11.3 moles of HCl and 21.5 moles of air.

The maximum temperature at the hot point in the interior of the catalytic mass is 472° C. Condensers kept at 20° C., 0° C. and −80° C., respectively, collect a total of 235 grams of product liquid at 20° C. per 100 grams of propene introduced. These liquid products have the following composition, by weight:

|   | Percent |
|---|---|
| Trichloropropanes | 45.7 |
| Dichloropropanes | 37.6 |
| Tetrachloropropanes | 2.9 |
| Monochloropropanes | 0.04 |
| Monochloropropenes | 7.8 |
| Dichloropropenes | 2.6 |
| Propene (dissolved) | 0.06 |
| $CCl_4 + C_2Cl_4$ | 1.4 |
| $C_2HCl_3$ | 1.9 |

Combustion products in the form of CO and $CO_2$ represent 3.8% by weight of the propene introduced. The conversion rate, based upon the propene introduced, is 97% with 3% remaining unchanged in the effluent. The conversion rate of the HCl used is 82%.

EXAMPLE 2

The method is the same as that of Example 1 except that:

(1) The catalytic mass is formulated to consist of 70% by volume activated alumina balls having a specific surface equal to 87 m.$^2$/g. and impregnated with 5% by weight of copper in the form of $CuCl_2$, 3% by weight of potassium in the form of KCl, and 30% by volume of graphite particles having a diameter of 3 to 5 mm.

(2) While the nickel tube is being heated exteriorly by an oil bath at a temperature of 290° C., the reactants are introduced at an hourly flow rate of 4 moles of propene, 12.1 moles of HCl and 19.7 moles of air.

(3) The maximum temperature at any hot point in the interior of the catalytic mass is 400° C.

226 grams of products, liquid at 20° C., are collected in the condensers per 100 grams of propene introduced. The liquid products have the following composition, by weight:

| | Percent |
|---|---|
| Trichloropropanes | 46.9 |
| Dichloropropanes | 40.1 |
| Tetrachloropropanes | 1.9 |
| Monochloropropanes | Traces |
| Monochloropropenes | 8.2 |
| Dichloropropenes | 1.1 |
| Propene (dissolved) | 0.1 |
| $CCl_4+C_2Cl_4$ | 1.1 |
| $C_2HCl_3$ | 0.6 |

6.4% by weight of the propene used is recovered in the form of CO and $CO_2$. The conversion rate of propene introduced is 95% and the conversion rate of the HCl is 69%.

EXAMPLE 3

The method of Example 2 is followed except that the reagents are introduced through the catalytic mass at the hourly flow rate of 4 moles of propene, 24.7 moles of HCl, and 20.2 moles of air, and the wall temperatures of the reactor and the hot point in the interior of the catalytic mass are, respectively, 315° and 423° C.

264 grams of products, liquid at 20° C., are collected in the condensers per 100 grams of propene. These liquid products present the following compositions, by weight:

| | Percent |
|---|---|
| Trichloropropanes | 46.9 |
| Dichloropropanes | 40.1 |
| Tetrachloropropanes | 1.9 |
| Monochloropropanes | Traces |
| Monochloropropenes | 8.2 |
| Dichloropropenes | 1.1 |
| Propene (dissolved) | 0.1 |
| $CCl_4+C_2Cl_4$ | 1.1 |
| $C_2HCl_3$ | 0.6 |

2.8% of the propene used is recovered in the form of combustion products CO and $CO_2$. The conversion rate of propene introduced is 97% while the conversion rate of the HCl is 39%.

It will be understood that changes may be made in the details of formulation and operation without departing from the spirit of the invention, especially as defined in the following claims.

We claim:

1. A process for the production of trichloropropanes comprising reacting propene, hydrogen chloride and oxygen in a vapor phase, in a reaction zone in a molecular ratio of propene/$O_2$/HCl of 1/0.90 to 1.10/2.5 to 3.5 in the presence of a catalytic mass in the form of a fixed bed having as its principal active agent a compound selected from the group consisting of copper chloride and oxychlorides of copper deposited on a catalytic support having a specific surface within the range of 1 to 300 m.$^2$/g. and in which the maximum temperature within the interior of the catalytic mass is 30° to 200° C. higher than the temperature of the wall about the reaction zone at a flow rate of 1–100 moles of propene per liter of catalyst per hour, and heating the reaction zone to a wall temperature within the range of 170° to 370° C.

2. The process as claimed in claim 1 in which the propene is introduced in admixture with nitrogen, air or water vapor.

3. The process as claimed in claim 1 in which the oxygen is introduced in admixture with nitrogen or water vapor.

4. The process as claimed in claim 1 which includes the step of preheating the reactants in a zone provided with catalytically and chemically inert materials at a temperature within the range of 170° to 370° C. before introduction into the reactor.

5. The process as claimed in claim 1 in which the reaction is carried out under a pressure of from 1 to 10 bars.

References Cited

UNITED STATES PATENTS

| 2,783,286 | 2/1957 | Reynolds | 260—659 |
| 3,427,359 | 2/1969 | Rectenwald et al. | 260—659 |
| 3,454,663 | 7/1969 | Ryckaert et al. | 260—659 |
| 3,461,084 | 8/1969 | Li | 260—659(X) |
| 3,468,968 | 9/1969 | Baker et al. | 260—659 |

BERNARD HELFIN, Primary Examiner

J. A. BOSKA, Assistant Examiner